(12) United States Patent
Fujita et al.

(10) Patent No.: US 11,524,428 B2
(45) Date of Patent: Dec. 13, 2022

(54) CLEANING AGENT FOR MOLDING-MACHINE CLEANING AND CLEANING METHOD

(71) Applicant: Masanori Fujita, Tokyo (JP)

(72) Inventors: Masanori Fujita, Tokyo (JP); Toshiaki Hirao, Aichi (JP); Kazuhiko Iida, Aichi (JP); Kota Imazu, Aichi (JP)

(73) Assignee: Masanori Fujita, Tokyo (JP)

( * ) Notice: Subject to any disclaimer, the term of this patent is extended or adjusted under 35 U.S.C. 154(b) by 389 days.

(21) Appl. No.: 16/648,282

(22) PCT Filed: Jun. 29, 2018

(86) PCT No.: PCT/JP2018/024756
§ 371 (c)(1),
(2) Date: Mar. 18, 2020

(87) PCT Pub. No.: WO2019/058697
PCT Pub. Date: Mar. 28, 2019

(65) Prior Publication Data
US 2020/0282606 A1    Sep. 10, 2020

(30) Foreign Application Priority Data

Sep. 19, 2017    (JP) .............................. JP2017-178546

(51) Int. Cl.
| | |
|---|---|
| *C11D 11/00* | (2006.01) |
| *B29C 33/72* | (2006.01) |
| *C08K 7/14* | (2006.01) |
| *C08L 101/00* | (2006.01) |
| *C11D 7/20* | (2006.01) |
| *C11D 7/22* | (2006.01) |

(52) U.S. Cl.
CPC .............. *B29C 33/722* (2013.01); *C08K 7/14* (2013.01); *C08L 101/00* (2013.01); *C11D 7/20* (2013.01); *C11D 7/22* (2013.01); *C11D 11/0041* (2013.01)

(58) Field of Classification Search
CPC ....................................................... B29C 48/27
USPC .................................. 134/22.1; 510/188, 245
See application file for complete search history.

(56) References Cited

U.S. PATENT DOCUMENTS

| | | | |
|---|---|---|---|
| 4,048,137 | A | 9/1977 | Heitmann |
| 4,124,730 | A | 11/1978 | Albert et al. |

(Continued)

FOREIGN PATENT DOCUMENTS

| | | |
|---|---|---|
| CN | 105778334 A | 7/2016 |
| CN | 106336508 A | 1/2017 |

(Continued)

OTHER PUBLICATIONS

WIPO, International Search Report dated Sep. 4, 2018.

(Continued)

*Primary Examiner* — Gregory E Webb
(74) *Attorney, Agent, or Firm* — Li & Cai Intellectual Property (USA) Office

(57) ABSTRACT

The object of the present invention is to provide a cleaning agent that is superior in the initial cleaning effect and allows residues to be easily distributed evenly in the next fabricated molded article. The object is achieved by a cleaning agent used for a molding machine and including a thermoplastic resin and a glass wool.

2 Claims, 3 Drawing Sheets

(56) References Cited

U.S. PATENT DOCUMENTS

| | | | | |
|---|---|---|---|---|
| 5,298,078 | A | * | 3/1994 | Itoh .................. C08L 25/06 510/475 |
| 6,551,411 | B1 | * | 4/2003 | Ito .................... B29C 48/27 510/400 |
| 9,364,976 | B2 | | 6/2016 | Sano et al. |
| 10,731,002 | B2 | | 8/2020 | Zhang et al. |
| 2012/0000489 | A1 | * | 1/2012 | Wakita ............ B29C 33/722 134/22.1 |
| 2016/0053092 | A1 | * | 2/2016 | Fujita ................ C08K 7/14 524/494 |
| 2019/0030790 | A1 | | 1/2019 | Fujita |

FOREIGN PATENT DOCUMENTS

| | | |
|---|---|---|
| EP | 2985319 A1 | 2/2016 |
| GB | 1423708 A | 2/1976 |
| JP | H5-42546 A | 2/1993 |
| JP | H0542546 A | 2/1993 |
| JP | H08311327 A | 11/1996 |
| JP | 2561685 B | 12/1996 |
| JP | 2008-201975 A | 9/2008 |
| JP | 2009-39863 A | 2/2009 |
| JP | 2011183638 A | 9/2011 |
| WO | 2008/102891 A1 | 8/2008 |
| WO | 2010/044253 A1 | 4/2010 |
| WO | 2013/153443 A1 | 10/2013 |
| WO | 2017/130469 A1 | 8/2017 |

OTHER PUBLICATIONS

WIPO, Written Opinion of the International Searching Authority dated Aug. 27, 2018.

European Patent Office, European patent search report dated Sep. 10, 2020.

Masaya Tsukamoto, et al., "Evaluation of the Tensile Strength of Polypropylene-based Composites Containing Glass Wool"; Materials Letters; Oct. 1, 2014; pp. 267-269; vol. 132; ScienceDirect.

European Patent Office, Office action dated Apr. 20, 2021.

Malaysian Patent Office, Office action dated Jun. 28, 2022.

* cited by examiner

CLEANING AGENT FOR MOLDING-MACHINE CLEANING AND CLEANING METHOD

FIELD OF THE DISCLOSURE

The present disclosure relates to a cleaning agent for molding-machine cleaning and a cleaning method, in particular, relates to a cleaning agent and a cleaning method suitable for removal of residues inside a molding machine.

BACKGROUND OF THE DISCLOSURE

Molding machines such as an extrusion molding machine or an injection molding machine are used in coloring of thermoplastic resins, mixing of thermoplastic resins, fabrication of molded articles, or the like. When using a molding machine for operation, it is necessary to remove a resin (residue) remaining inside a cylinder when exchanging resin materials. Further, it is necessary to remove a foreign material (residue) such as burning or carbide resulted after a resin remains inside the cylinder and is attached thereto due to a long time of continuous use. If such residues are not removed when resin materials are exchanged, the residues are mixed into a molded article during the next molding, and this causes an appearance defect of a product.

As a method of removing residues from the inside of a molding machine, a method of manually disassembling and cleaning a molding machine, a method of filling a molding material to be used next in a molding machine without stopping the molding machine and gradually replacing the residues, a method of using a cleaning agent, and the like are known.

Among the methods described above, the method of using a cleaning agent has been preferably used in recent years because of its superiority in cleaning power to remove the previous molding material and in easy replaceability to the next molding material.

A cleaning agent in which a material having a polishing effect such as a fiber is contained in a thermoplastic resin is known. For example, a cleaning agent containing a thermoplastic resin and a glass fiber (see Patent Reference 1), a cleaning agent containing a thermoplastic resin and rock wool or a glass fiber (see Patent Reference 2), and a cleaning agent containing a thermoplastic resin and a cellulose fiber (see Patent Reference 3) are known.

CITATION LIST

Patent Reference

Patent Reference 1: Japanese Patent No. 2561685
Patent Reference 2: Japanese Patent Application Publication No. 2008-201975
Patent Reference 3: Japanese Patent Application Publication No. 2009-39863

SUMMARY OF THE DISCLOSURE

Technical Problem

It is desirable that a cleaning agent have an effect that enables quick cleaning of a molding machine. In cleaning of a molding machine, it may be possible to fabricate the next molded article without completely removing influence of the previously used molding material. For example, when a gray molded article is fabricated after a black colored molded article is fabricated, if cleaning is made to the degree that the influence of the color caused by residues does not affect the color of the next molded article, it is possible to proceed to the fabrication step for the next molded article without completely removing the influence of the previously used molding material, and manufacturing efficiency is improved.

When fabricating the next molded article without completely removing the influence of the previously used molding material by using a cleaning agent, it is desirable to remove residues inside the molding machine evenly as much as possible, in other words, it is desirable that residues be evenly contained in the next molded article.

Further, in a case of injection molding, it is desirable that not only residues in a molding machine but also residues in a mold used for injection molding be removed evenly as much as possible. For example, if the next molded article is fabricated without residues being evenly removed when the color is changed, the color may be uneven and a mottled pattern may appear, which may result in a defective product.

However, the inventors have newly found a problem that, when a cleaning agent containing a glass fiber that is expected to have high cleaning performance is used for cleaning, residues are unevenly removed and it takes time for the removal until influence of the residues is eliminated.

The present disclosure has been made to solve the above problem, and intensive studies have newly found that, compared to the conventional cleaning agent in which a thermoplastic resin is filled with glass fibers, a use of a cleaning agent in which a thermoplastic resin is filled with a glass wool results in (1) that an initial cleaning effect immediately after the start of cleaning is superior and (2) that residues are easily distributed evenly in the next fabricated molded article.

That is, the present disclosure intends to provide a cleaning agent and a cleaning method suitable for removal of residues inside a molding machine or a mold.

Solution to Problem

The present disclosure relates to a cleaning agent for molding-machine cleaning and a cleaning method, as described below.

(1) A cleaning agent used for cleaning a molding machine, the cleaning agent including:
   a thermoplastic resin; and
   a glass wool.
(2) The cleaning agent according to the above (1), wherein 50 to 80% by weight of the glass wool is contained to the cleaning agent.
(3) The cleaning agent according to the above (1) or (2), wherein the glass wool is not treated with a lubricant agent and/or a silane coupling agent.
(4) A cleaning method for a molding machine, the cleaning method including at least:
   a heating step of heating the molding machine; and
   a cleaning step of supplying the cleaning agent according to any one of the above (1) to (3) into the heated molding machine to clean an inside of the molding machine.
(5) The cleaning method according to (4), wherein the cleaning agent is the cleaning agent according to the above (3).

Advantageous Effects of Invention

The cleaning agent used for cleaning a molding machine of the present disclosure allows for a superior initial cleaning effect and a more even distribution of residues in the next fabricated molded article compared to the conventional cleaning agent.

BRIEF DESCRIPTION OF THE DRAWINGS

FIG. 1 are photographs substitute for a drawing, in which FIG. 1A is a photograph of glass wools, FIG. 1B is a photograph of a glass fiber roving in which glass fibers are wound, and FIG. 1C is a photograph of chopped strands obtained by cutting a glass fiber roving into a predetermined length.

FIG. 2A is a photograph of plates fabricated first, fifth, tenth, and fifteenth in order from the left after a cleaning agent of Example 1 is supplied. FIG. 2B is a photograph of plates fabricated first, fifth, tenth, and fifteenth in order from the left after a cleaning agent of Example 2 is supplied. FIG. 2C is a photograph of plates fabricated first, fifth, tenth, and fifteenth in order from the left after a cleaning agent of Comparative Example 1 is supplied.

FIG. 3 are photographs substitute for a drawing, in which FIG. 3A is a SEM photograph of a cleaning agent of Example 1, and FIG. 3B is a SEM photograph of a cleaning agent of Example 2.

DETAILED DESCRIPTION OF THE EXEMPLARY EMBODIMENTS

A cleaning agent for molding-machine cleaning and a cleaning method disclosed in the present specification will be described below in detail.

The embodiment of the cleaning agent disclosed in the present specification contains a glass wool and a thermoplastic resin.

Figure 1:
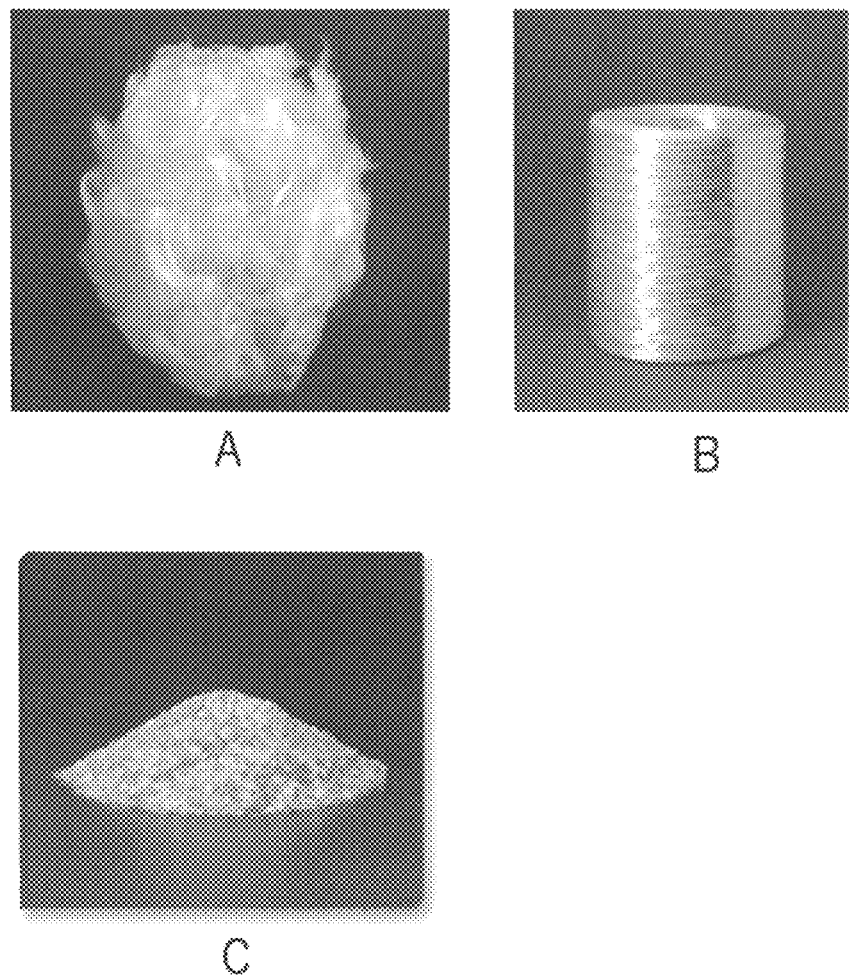

FIG. 1A is a photograph of "glass wool" in the present specification. The term "glass wool" means one or more cotton-like glass fibers manufactured by blowing a melted glass composition out of a rotating spinner by centrifugal force, having a diameter of around 0.1 to 10 μm, and containing a large amount of air.

On the other hand, FIG. 1B is a photograph of a glass fiber roving in which glass fibers are wounded, and FIG. 1C is a photograph of chopped strands obtained by gathering and cutting 50 to 200 glass fiber rovings into a predetermined length. A glass fiber is manufactured by drawing a melted glass to be fiber-shaped, and the diameter of the fiber is approximately 9 to 18 μm. Although "glass wool" and "glass fiber roving (chopped strand)" can be manufactured from the same material, as is apparent from the photographs of FIGS. 1A to 1C, the shapes as articles are different due to the difference in the manufacturing method, and the using methods thereof are also different.

Note that a chopped strand is a short strand cut from a glass fiber roving and thus may be referred to as "glass short fiber". As described above, however, a chopped strand is completely different from "glass wool".

Since "glass wool" is not used as a reinforcement member, the glass composition of "glass wool" used for a cleaning agent is not particularly limited. The composition may be a known composition such as an E-glass, a C-glass, an A-glass, an S-glass, a D-glass, an NE-glass, a T-glass, an H-glass, a Q-glass, a quartz glass, or the like.

The average fiber diameter of the glass wool can be adjusted by a viscosity of a melted glass composition and a rotational rate of a spinner, a gas jet energy, or the like. In general, the average fiber diameter of the glass wool is preferably greater than or equal to 0.1 μm and less than or equal to 10 μm. If the average fiber diameter is greater than 10 μm, flexibility decreases, which is not preferable. The average fiber diameter is preferably less than or equal to 7 μm, and more preferably less than or equal to 5 μm. On the other hand, if the average fiber diameter is less than 0.1 μm, the manufacturing cost increases, and a polishing effect is less likely to be obtained. Therefore, the average fiber diameter is preferably greater than or equal to 0.5 μm and may be adjusted as appropriate to 1 μm or greater, 2 μm or greater, 3 μm or greater, or the like in accordance with the purpose. Note that, although the glass wool can be manufactured by the method described above, a commercially available product may be used.

The thermoplastic resin is not particularly limited as long as the glass wool can be kneaded therein. The thermoplastic resin may be, for example, a thermoplastic resin conventionally used, such as a general purpose plastic, an engineering plastic, a super engineering plastic, or the like. Specifically, the general purpose plastic may be polyethylene (PE), polypropylene (PP), polyvinyl chloride (PVC), polyvinylidene chloride, polystyrene (PS), polyvinyl acetate (PVAc), polytetrafluoroethylene (PTFE), an acrylonitrile butadiene styrene resin (ABS resin), a styrene-acrylonitrile copolymer (AS resin), an acrylic resin (PMMA), or the like. The engineering plastic may be polyamide (PA) represented by nylon, polyacetal (POM), polycarbonate (PC), modified polyphenyleneether (m-PPE, modified PPE, PPO), polybutylene terephthalate (PBT), polyethylene telephthalate (PET), syndiotactic polystyrene (SPS), cyclic polyolefin (COP), or the like. The super engineering plastic may be polyphenylene sulfide (PPS), polytetrafluoroethylene (PTFE), polysulfone (PSF), polyethersulfone (PES), amorphous polyarylate (PAR), polyether ether ketone (PEEK), thermoplastic polyimide (PI), polyamide imide (PAI), or the like. One type of these resins or a combination of two or more types of these resins may be used.

Note that the melting temperature of a thermoplastic resin differs in accordance with the type of the resin. Therefore, when performing cleaning by using the cleaning agent according to the embodiment, it is preferable to use thermoplastic resins having close melting temperatures.

The glass wool is an inorganic material, while the thermoplastic resin is an organic material. Thus, the thermoplastic resin may be formed after a surface treatment with a silane coupling agent. The silane coupling agent is not particularly limited and may be any silane coupling agent that is used conventionally, which can be determined taking reactivity with a thermoplastic resin forming a filament, thermal stability, or the like into consideration. For example, the silane coupling agent may be an amino silane-based silane coupling agent, an epoxy silane-based silane coupling agent, an aryl silane-based silane coupling agent, a vinyl silane-based silane coupling agent, or the like. As these silane coupling agents, a commercially available product such as Z-series by Dow Corning Toray Co., Ltd., KMB series or KBE series by Shin-Etsu Chemical Co., Ltd., a silane coupling agent by JNC Corporation, or the like may be used.

Further, a surface treatment may be performed on the glass wool by using a lubricant agent. The lubricant agent may be a silicon oil, a calixarene, or the like.

The glass wool may be treated with the silane coupling agent or the lubricant agent described above or may be treated with the silane coupling agent and the lubricant agent. When the glass wool is treated with a silane coupling agent and/or a lubricant agent, an appropriate setting is made to obtain a preferable range.

The glass wool contained in the cleaning agent according to the embodiment functions as a polishing agent rather than as a reinforcement member. Therefore, since it is not necessary to increase adhesion with the thermoplastic resin, the glass wool may be kneaded directly in the thermoplastic resin without being treated with the silane coupling agent and/or the lubricant agent described above. Further, as illustrated in examples described later, when the glass wool without being treated with the silane coupling agent and/or the lubricant agent is used, an advantageous effect of a superior initial cleaning effect and residues being easily distributed evenly in a molded article is exhibited compared to a case where the glass wool with being treated with the silane coupling agent and/or the lubricant agent is used. Furthermore, no surface treatment with a silane coupling agent and/or a lubricant agent is performed on glass wool used for a heat insulating material, a cotton-like glass vacuum heat insulating material used as a heat insulating material of a refrigerator, or the like. Therefore, since product mill ends or used glass wools used for a heat insulating material or a vacuum heat insulating material can be directly used, waste materials can be reused.

The content ratio of the glass wool to the whole weight of a cleaning agent is preferably 50 to 80% by weight, and more preferably 60 to 70% by weight. If the content ratio is less than 50% by weight, a cleaning effect is less likely to be obtained. On the other hand, if the content ratio is greater than 80% by weight, when a molded article containing no or a small amount of glass wool is fabricated after cleaned by using the cleaning agent according to the embodiment, cleaning by using a resin containing no glass wool is required until the influence of residues of the glass wool is eliminated, and it takes time to switch the current step to the next step of fabrication of a molded article.

Note that, although the cleaning agent can be manufactured by using a thermoplastic resin and a glass wool, inorganic fine particles of SiO2 or the like, an organic foaming agent, an additive agent (fatty acid-based lubricant agent) may be added if necessary.

The cleaning agent according to the embodiment can be manufactured by melting and kneading the thermoplastic resin and the glass wool at 200 to 400 degrees Celsius by using a known melting and kneading machine such as a single-screw or multi-screw extruder, a kneader, a mixing roll, a Banbury mixer, or the like. Although the manufacturing apparatus is not particularly limited, a use of the twin screw extruder for melting and kneading is simple and preferable. The shape of the cleaning agent is not particularly limited as long as the cleaning agent can be supplied into a molding machine to be cleaned, and the shape may be cotton-like, pellet-like, or the like.

As the ratio of the glass wool untreated with a silane coupling agent and/or a lubricant agent in the cleaning agent increases, kneading to the thermoplastic resin becomes difficult. In such a case, the glass wool is heated so as to be at a temperature close to the melting temperature of the thermoplastic resin used for the cleaning agent and supplied into the melted thermoplastic resin. Further, if necessary, the glass wool may be cracked into pieces of an average fiber length of 0.2 mm to 2 mm and then supplied into the melted thermoplastic resin.

Note that the present inventors filed a patent application related to a composite molding material in which a thermoplastic resin is filled with glass wool (see Japanese Patent No. 5220934). However, the composite molding material disclosed in Japanese Patent No. 5220934 is the invention for increasing the fiber length of glass wool filled in the thermoplastic resin and increasing the filler amount of the glass wool and is used for injection molding. On the other hand, the cleaning agent according to the embodiment is used for a specific use of cleaning of a molding machine or the like and is a novel invention related to a different use.

The cleaning method according to the embodiment can efficiently clean a cylinder portion of a molding machine and further a mold connected to the molding machine by using the cleaning agent according to the embodiment. The molding machine may be a known molding machine such as an injection molding machine, an extrusion molding machine, a blow molding machine, or the like. Further, a mold is also not particularly limited as long as it can be connected to the molding machine.

The cleaning method includes at least a heating step of first heating a cylinder portion of a molding machine and then a cleaning step of supplying a cleaning agent to clean the cylinder portion inside the molding machine and, if necessary, a mold connected thereto. The cleaning step may be performed multiple times, if necessary.

While examples will be presented below to specifically describe the embodiment, these examples are provided for reference of specific forms and not intended to limit or restrict the scope of the invention disclosed by this application.

EXAMPLES

[Fabrication of Cleaning Agent]

Example 1

As the thermoplastic resin, an AS resin (copolymer of acrylonitrile and styrene, K-1163 by NIPPON A&L INC.) was used. The glass wool was produced by a centrifugation method, and the average fiber diameter was around 3.6 μm.

The glass wool was then cracked into pieces of an average fiber length of 850 by using a cutter mill. As an extrusion molding machine, PCM-37 by Ikegai Corp (twin screw kneading extruder) and a hot feeder (glass wool supplying machine by Ikegai Corp) were used to add and knead the glass wool into the melted AS resin so that the ratio of the glass wool in the cleaning agent was 50 wight %. The kneading was performed under conditions of a screw rotational rate of 125 rpm, a cylinder temperature of 200 to 240 degrees Celsius, a screw temperature of the hot feeder of 100 degrees Celsius, a vacuum pressure of 420 hPa, and a motor load of 15A. After kneading, the kneaded material was extruded and cut into a cotton shape to fabricate pellet-like cleaning agents.

Example 2

Pellets were fabricated in the same procedure as in Example 1 except that a glass wool treated with a silane coupling agent was used instead of the glass wool of Example 1. The glass wool treated with a silane coupling agent was produced by spraying a solution containing the silane coupling agent from a binder nozzle to the glass wool blown out of a spinner in production by a centrifugation method. As a silane coupling agent, amino silane coupling agent 5330 (by JNC Corporation) was used. The weight percent of the silane coupling agent to the glass wool was 0.24% by weight.

Comparative Example 1

A cleaning agent was fabricated in the same procedure as in Example 1 except that a glass fiber (ECS03-630 by CENTRAL GLASS CO., LTD.) was used instead of the glass wool of Example 1.

[Review of Cleaning Effect]

For reviewing the cleaning effect, the cleaning agent was evaluated by using a mold to perform plate molding and reviewing color change in resins and exchange of resins in continuous molding.

Example 3

First, a resin material from which a molded article colored in black can be fabricated was prepared by dry-blending a carbon master batch (ROYAL BLACK 9002P by ECCA CO., LTD.) into an ABS resin.

Figure 2:
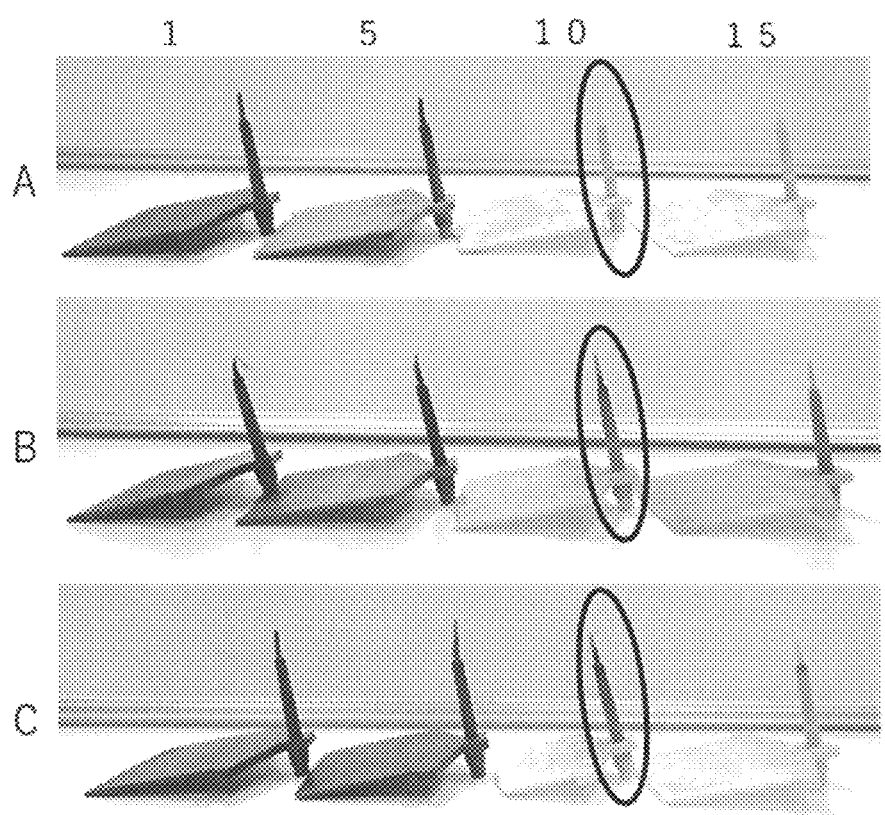
FIG. 2 are photographs substitute for a drawing.

Next, a mold used for plate molding was connected to an injection molding machine (SE18S by Sumitomo Heavy Industries, Ltd), the fabricated resin material was supplied, and plate molding was performed. Next, after the resin material (colored resin) inside the molding machine was extruded, the cleaning agent fabricated in Example 1 was supplied into an injection molding machine. Next, plates were continuously fabricated by flowing the cleaning agent into the mold while cleaning the inside of the injection molding machine by the cleaning agent. FIG. 2A is a photograph of plates fabricated first, fifth, tenth, and fifteenth in order from the left after the cleaning agent of Example 1 is supplied.

Example 4

Plates were fabricated in the same procedure as in Example 3 except that the cleaning agent of Example 2 was used instead of the cleaning agent of Example 1. FIG. 2B is a photograph of plates fabricated first, fifth, tenth, and fifteenth in order from the left after the cleaning agent of Example 2 is supplied.

Comparative Example 2

Plates were fabricated in the same procedure as in Example 1 except that the cleaning agent fabricated in Comparative Example 1 was used instead of the cleaning agent fabricated in Example 1. FIG. 2C is a photograph of plates fabricated first, fifth, tenth, and fifteenth after the cleaning agent of Comparative Example 1 is supplied.

As is apparent from the photographs of the fifth plates of FIG. 2A and FIG. 2B and the photograph of the fifth plate of FIG. 2C, it was confirmed that the initial cleaning effect was higher when the cleaning agents of Examples 1 and 2 fabricated by using the glass wool were used than when the cleaning agent of Comparative Example 1 fabricated by using the glass fiber was used.

Further, as indicated in a portion surrounded by a black circle in the photograph of the tenth plate FIG. 2A, when the cleaning agent of Example 1 was used, the color near the material supply port of the mold and the color of the plate portion were substantially the same. Further, as indicated in a portion surrounded by a black circle in the photograph of the tenth plate of FIG. 2B, when the cleaning agent of Example 2 was used, the gray color remained near the material supply port of the mold and was slightly different from the color of the plate portion. On the other hand, as indicated in a portion surrounded by a black circle in the photograph of the tenth plate of FIG. 2C, when the cleaning agent of Comparative Example 1 was used, the black color remained near the material supply port of the mold and was apparently different from the color of the plate portion. It was confirmed from the above results that, when the glass wool is used, the initial cleaning effect is superior and residues are easily distributed evenly in a molded article compared to the case where the glass fiber is used. Note that the reason why a part near the material supply port of the mold of a plate is colored in black in particular is considered to lie in the influence of a colored resin remaining in a backflow prevention portion of the screw frontend of the injection molding machine. Since the cleaning agent with the glass wool has a higher initial cleaning effect and does not cause residues to concentrate in a particular portion of a molded article, it is considered that even cleaning was made into details of the components inside the molding machine.

Figure 3:
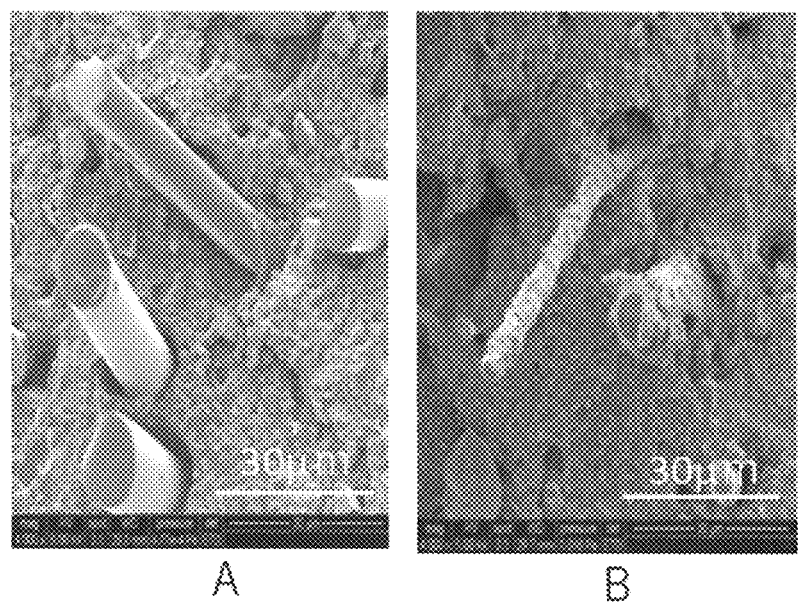

Further, when the glass wool was used, residues of the plate were more even for the glass wool not treated with silane coupling agent, and SEM photographs of the cleaning agents fabricated in Example 1 and Example 2 were taken accordingly. FIG. 3A and FIG. 3B are SEM photographs of the cleaning agents of Example 1 and Example 2, respectively. As is apparent from the photograph of FIG. 3A, when the glass wool not treated with a silane coupling agent was used, a gap was confirmed between the glass wool and the AS resin. On the other hand, the glass wool treated with a silane coupling agent was adhered to the AS resin, and the surface of the exposed glass wool was attached with some component and thus was not smooth. It is considered from the above results that, since a use of the glass wool not treated with a silane coupling agent is likely to cause phase separation from the thermoplastic resin during the cleaning inside the molding machine and is more likely to exhibit a polishing effect because of the absence of an attached substance on the surface, a portion in the molding machine where residues are likely to be retained was able to be cleaned evenly.

INDUSTRIAL APPLICABILITY

The cleaning agent and the cleaning method of a molding machine by using the cleaning agent according to the embodiment have a superior initial cleaning effect and can clean a molding machine evenly compared to the case where the conventional cleaning agent is used. Therefore, the cleaning agent and the cleaning method described above according to the embodiment are useful for manufacturing of products by using a molding machine.

What is claimed is:

1. A cleaning agent used for cleaning a molding machine, the cleaning agent comprising:
   a thermoplastic resin; and
   a glass wool,
   wherein more than 50% and not more than 80% by weight of the glass wool is contained to the cleaning agent,
   wherein the glass wool is not treated with a lubricant agent nor a silane coupling agent.

2. A cleaning method for a molding machine, the cleaning method comprising at least:
   heating the molding machine; and
   supplying the cleaning agent according to claim 1 into the heated molding machine to clean an inside of the molding machine.

* * * * *